(12) United States Patent
Jang et al.

(10) Patent No.: US 8,829,748 B2
(45) Date of Patent: Sep. 9, 2014

(54) CONNECTING MOLDING FOR AUTOMATION OF THREE-PHASE MOTOR WINDING

(75) Inventors: Jin Wook Jang, Chungcheongnam-do (KR); Yong Taek Hang, Chungcheongnam-do (KR); Jong Ung Lee, Chungcheongnam-do (KR); Il Kyu Choi, Chungcheongnam-do (KR)

(73) Assignee: Hyundam Industrial Co., Ltd., Chungcheongnam-do (KR)

( * ) Notice: Subject to any disclaimer, the term of this patent is extended or adjusted under 35 U.S.C. 154(b) by 409 days.

(21) Appl. No.: 13/148,875

(22) PCT Filed: Feb. 12, 2010

(86) PCT No.: PCT/KR2010/000896
§ 371 (c)(1),
(2), (4) Date: Aug. 10, 2011

(87) PCT Pub. No.: WO2010/093192
PCT Pub. Date: Aug. 19, 2010

(65) Prior Publication Data
US 2011/0309700 A1    Dec. 22, 2011

(30) Foreign Application Priority Data
Feb. 16, 2009   (KR) .................. 10-2009-0012523

(51) Int. Cl.
*H02K 3/52*        (2006.01)
(52) U.S. Cl.
CPC ............ *H02K 3/522* (2013.01); *H02K 2203/09* (2013.01)

USPC ........................................................... 310/71
(58) Field of Classification Search
CPC .......... H02K 3/52; H02K 3/522; H02K 5/521
See application file for complete search history.

(56) References Cited

U.S. PATENT DOCUMENTS

| | | | | |
|---|---|---|---|---|
| 5,828,147 A * | 10/1998 | Best et al. | .......................... | 310/71 |
| 6,177,741 B1 * | 1/2001 | Lutkenhaus et al. | ............ | 310/71 |
| 6,600,244 B2 * | 7/2003 | Okazaki et al. | ................. | 310/71 |
| 6,674,195 B2 * | 1/2004 | Yagyu et al. | ..................... | 310/71 |
| 6,983,528 B1 * | 1/2006 | Muller et al. | ................... | 29/596 |

(Continued)

FOREIGN PATENT DOCUMENTS

| | | | | |
|---|---|---|---|---|
| JP | 2004194367 A | * | 7/2004 | ............... H02K 3/52 |
| JP | 2006-512884 A | | 4/2006 | |
| KR | 10-0367940 B1 | | 3/2001 | |
| KR | 10-2008-0078949 A | | 8/2008 | |

OTHER PUBLICATIONS

Ishigami et al., JP2004194367 Machine Translation, Jul. 2004.*

(Continued)

*Primary Examiner* — Burton Mullins
*Assistant Examiner* — Eric Johnson
(74) *Attorney, Agent, or Firm* — Rabin & Berdo, P.C.

(57) ABSTRACT

The present invention relates to a connection molding for automation of a three-phase motor winding, which specifically comprises: a fixed coil part fixed inside of a main body, a coil part installed within the fixed coil part, a central shaft fixed to the main body and passing through the coil part, and a connector part coupled to the top of the coil part so that the coil of the coil part is connected thereto and the central shaft passes and is coupled therethrough.

2 Claims, 6 Drawing Sheets

(56) References Cited

U.S. PATENT DOCUMENTS

| | | |
|---|---|---|
| 7,262,529 B2 * | 8/2007 | Klappenbach et al. .......... 310/71 |
| 7,385,323 B2 * | 6/2008 | Takahashi et al. .............. 310/71 |
| 2005/0189828 A1 * | 9/2005 | Nakayama et al. ............. 310/71 |
| 2006/0043806 A1 * | 3/2006 | Torii et al. ....................... 310/71 |
| 2006/0091745 A1 | 5/2006 | Klappenbach et al. |
| 2007/0273221 A1 * | 11/2007 | Kinoshita et al. ............... 310/58 |

OTHER PUBLICATIONS

English Language Abstract of PCT/DE2003/001768 which is the PCT international application of JP 2006-512884 A1.

English Language Abstract of KR 10-2001-0024048 A which is the application publication of KR 10-0367940 B1.

English Language Abstract of KR 10-2008-0078949 A.

* cited by examiner

CONNECTING MOLDING FOR AUTOMATION OF THREE-PHASE MOTOR WINDING

TECHNICAL FIELD

The present invention is related to a connecting molding for automatic winding of three phase motor, more particularly, to a connecting molding for automatic winding of three phase motor comprising: a fixed coil unit coupled and fixed inside of a main unit; a coil unit installed inside of the fixed coil unit; a center shaft passing through the coil unit and fixed to the main unit; and a connector unit coupled to an upper end portion of the coil unit to connect a coil of the coil unit, the connector unit is coupled by the center shaft passing therethrough.

BACKGROUND ART

Various motors are basically identical in structure with a stator and a rotor. However, motors are classified according to a rotating principle of the rotator by mutual interaction between the stator and the rotor. Further, motors are classified according to kinds of power supplied to the stator coil, a phase or a method of winding the stator coil.

First, a conventional motor will be described referring to FIG. 1 and FIG. 2.

As illustrated in FIG. 1, a stator 1 includes: a stator core 2; teeth 3 formed plural along a circumference of the stator core 2; and an upper insulator 4 and a lower insulator 5 that respectively inserted into upper and lower portions of the stator core 2 and the teeth 3 to be wound with stator coil 6.

Moreover, a rotator (unshown) being connected to a rotating shaft (unshown) is disposed inside the stator 1, and a printed circuit board (PCB) 60 is fixed at an upper portion of the stator 1. That is, a fixed protrusion 22 formed at an upper portion of the stator 1 is inserted to a hole 61 formed in the PCB 60 to fix the PCB 60.

The stator 1, the rotor and the PCB 60 are accommodated inside a bracket 70. Meanwhile, the rotating shaft and the rotator to be rotated are supported by bearings (unshown) fixed at the bracket 70.

There are nine teeth 3 formed in FIG. 1 and FIG. 2 illustrating a winding of a stator coil 6 to each of the teeth 3 in concentrated winding type. FIG. 2 is an unfolded view of an outer circumference surface of the stator 1 illustrated in FIG. 1. Three phases (u, v, and w) of power are supplied to the illustrated stator coils 6 of each phase wound in 120° interval. A method for winding conventional stator coil 6 in such type of stator 1 is described as follows.

First, a stator coil of u phase 7 is wound at teeth No. 1 in clockwise direction (arrow direction). A direction of winding does not have to be a clockwise direction. However, in any case, the stator coils of each phase only have to be wound in identical direction.

After completing the winding, a connection line 12 of the stator coil of u phase 7 is escaped outside of the insulator through a groove 10 formed in the insulator 4. One end of the connection line is fixed at a protrusion 11 that determines a position of the connection line and is extended along an outer circumferential surface of the insulator. The extended connection line 12 is inserted again inside the insulator through a groove 10 formed in the insulator and wound again at teeth No. 4 in clockwise direction. In the same way, the connection line 12 is positioned to be wound again at teeth 7 in clockwise direction and a terminal end of the stator coil forms a neutral point (N).

Here, the stator coil of u phase 7 has two connection lines 12. The two connection lines 12 are positioned to be at different heights from each other. An adjustment of such positions are accomplished by the protrusion 11 formed at various heights.

A stator coil of v phase 8 is wound at teeth No. 2, teeth No. 5 and teeth No. 8. A stator coil of w phase 9 is wound at teeth No. 3, teeth No. 6 and teeth No. 9. Here, the stator coil of v phase 8 has two connection lines 13 and the stator coil of w phase 9 has two connection lines 14. These connection lines are positioned at heights different from each other.

Here, starting ends of the stator coils of u, v, and w phases are connected to their corresponding power supplies and the terminal ends of each stator coils are connected to each other to form the neutral point (N).

Meanwhile, as shown in FIG. 2, the connection lines 12, 13, and 14 of the stator coils of u, v, and w phases have to be positioned to secure insulating distances from each other. Accordingly, such connection lines have to be positioned to have heights different from each other. For this, the protrusions 11 have to be formed at heights different from each other along the outer circumferential surface of the insulator 4.

Moreover, since such connection lines are positioned only at the upper insulator 4, the heights where the protrusions 11 are formed have to be formed variously to afford a difference in heights among such connection lines. This resulted in a problem of increasing a height of the insulator. Further, since the protrusions of various heights have to be formed as shown in FIG. 1 and FIG. 2, a mold to manufacture the insulator becomes complicated and a cost for the insulator increases.

Additionally, even for one phase connection lines, positioning at different heights increases a probability of winding faults and has a problem that a sufficient distance between the connection lines are not secured.

Conventionally, when PCB 60 is positioned at the upper portion of the stator, the starting ends of the stator coils 7', 8' and 9' are directly soldered to the PCB 60, manufacturing process becomes complicated and causes mis-connection.

Therefore, the starting ends of the stator coils 7', 8' and 9' are positioned inside between the stator 1 and the bracket 70 to induce a concern that insulation may not be maintained. Generally, the stator core 2 is pressed and inserted to be fixed inside the bracket 70, and this forms a gap between the inside wall of the bracket and the insulator 4 of the stator very narrow.

Since an insulating tube (unshown) and a structure related to the insulating tube have to be used to fix the neutral point formed by the terminal ends of the stator coils, its manufacturing process is complicated. Further, since such neutral point is fixed on an outside surface of the insulator 4, there is a concern that a fault in insulation between the neutral point and the bracket.

DISCLOSURE

Technical Problem

In order to solve above problem, the object of the present invention is to provide a connecting molding for automatic winding of three phase motor that couples a connector unit connected with a ground coil of a coil unit and respective coils of 3 phases to an upper portion of the coil unit and automatically forms connections between the respective electrodes of the connector unit by a separate cable.

Technical Solution

The present invention to solve above problem is related to a connecting molding for automatic winding of three phase motor comprising: a fixed coil unit coupled and fixed inside of a main unit; a coil unit installed inside of the fixed coil unit; a center shaft passing through the coil unit and fixed to the main unit; a connector unit coupled to an upper end portion of the coil unit to connect a coil of the coil unit, the connector unit is coupled by the center shaft passing therethrough.

Advantageous Effects the present invention couples a connector unit connected with a ground coil of a coil unit and respective coils of 3 phases to an upper portion of the coil unit and automatically connects the coils. Thus, a manufacturing time is reduced and a cost for manufacture is reduced due to an automatic process without manual labor.

<Brief Description of numerals for major elements in drawings>

| 110: connector unit | 120: coil unit |
|---|---|
| 130: fixed coil unit | 140: main unit |
| 150: center shaft | |

MODE FOR INVENTION

Figure 1:
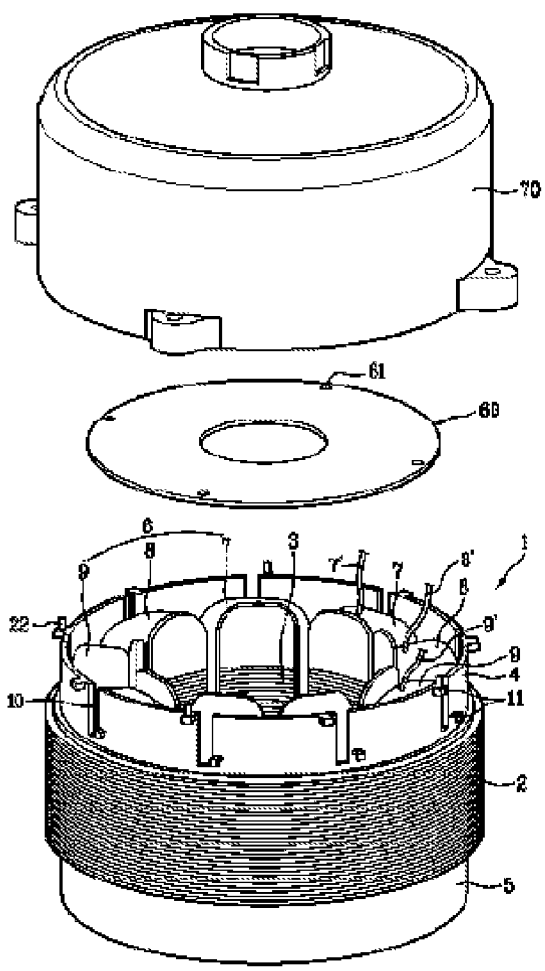
FIG. 1 is a view illustrating structure of conventional motor.
Figure 2:
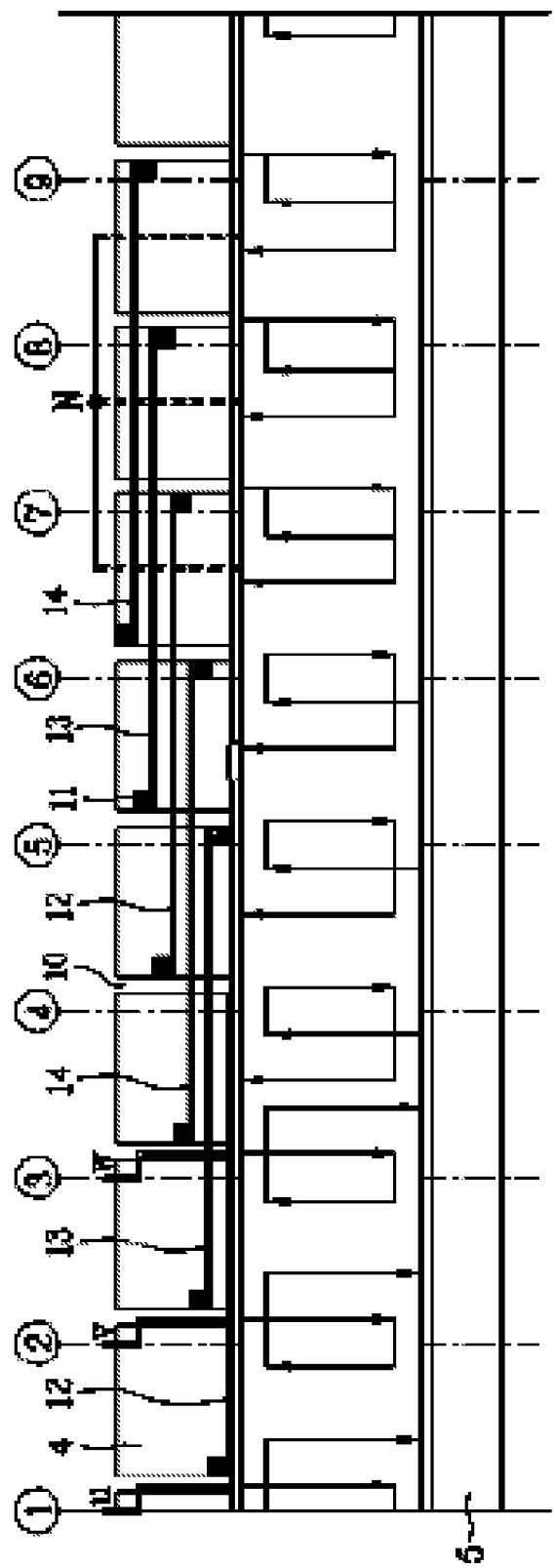
FIG. 2 is a view illustrating winding structure of conventional motor.
Figure 3:
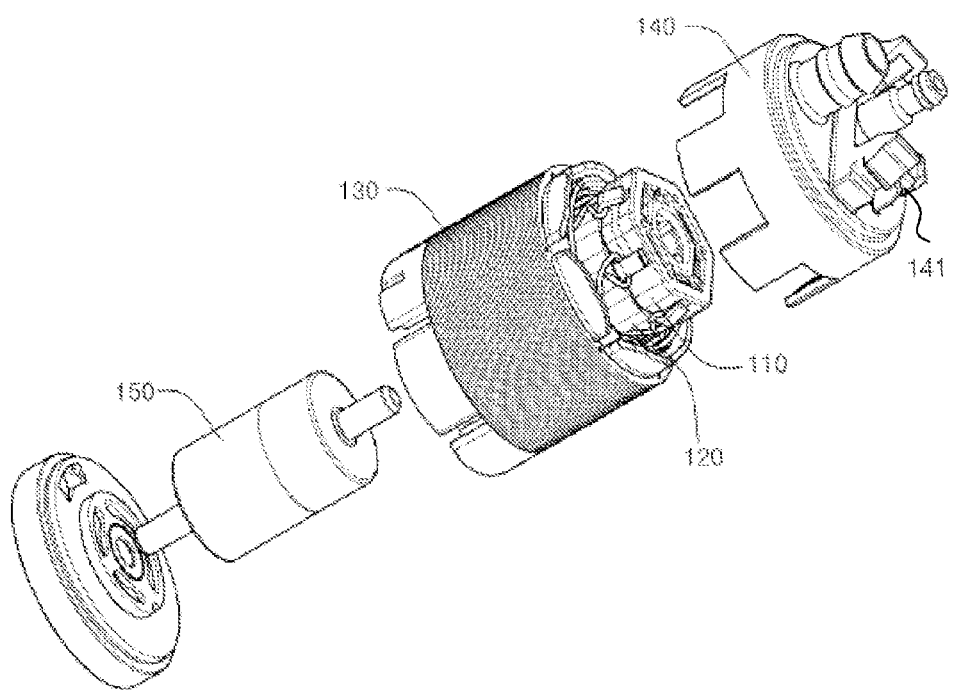
FIG. 3 is a perspective view illustrating whole connecting molding for automatic winding of three phase motor according to the present invention.
Figure 4:
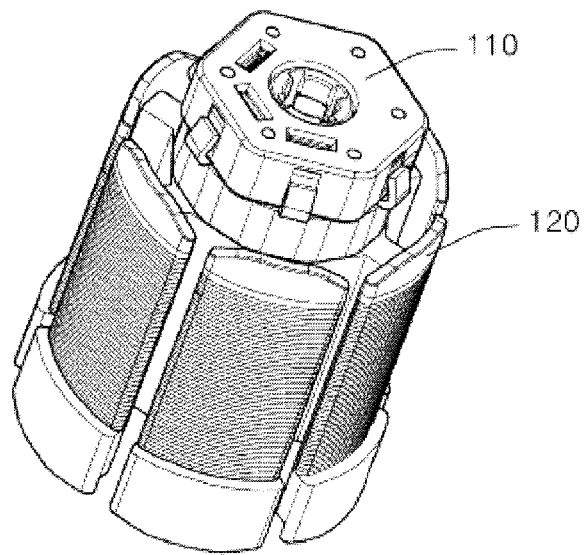
FIG. 4 is a perspective view illustrating coupled connector unit of connecting molding and coil unit for automatic winding of three phase motor according to the present invention.
Figure 5:
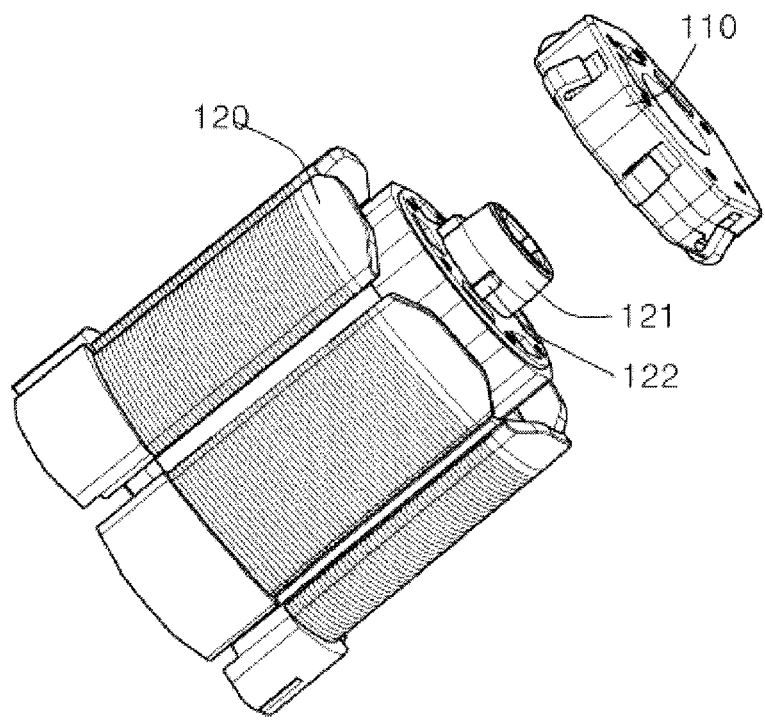
FIG. 5 is a perspective view illustrating separated connector unit of connecting molding and coil unit for automatic winding of three phase motor according to the present invention.

The present invention of a connecting molding for automatic winding of three phase motor as illustrated in FIG. 3 through FIG. 5 comprises: a main unit 140 formed of hard material in circular or polygonal column shape; a coil unit 120 inserted into the main unit 140 with a certain gap spaced apart from an inside of the main unit 140, and wound with coils of three phases composed of three U, V, and W phases and a ground coil grounding the coils of three phases; a center shaft 150 formed at a center of the coil unit 120 and passing through the main unit 140 to be coupled with the main unit 140, wherein a permanent magnet is coupled to an outside of the center shaft 150 and is spaced apart a certain gap from an inside of the coil unit 120 to be rotated in the coil unit 120; a fixed coil unit 130 installed between the coil unit 120 and the main unit 140 to be fixed to the main unit 140; and a connector unit 110 coupled to an upper side of the coil unit 120 to automatically connect the coils of three phases of the coil unit 120 by an automatic apparatus.

Figure 6:
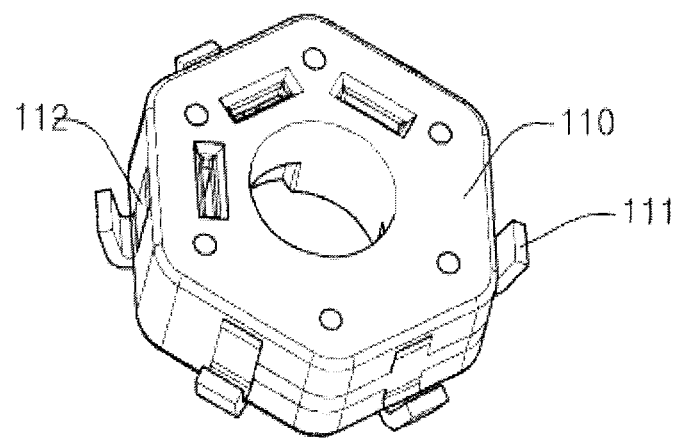
FIG. 6 is a perspective view illustrating connector unit of connecting molding for automatic winding of three phase motor according to the present invention.
Figure 7:
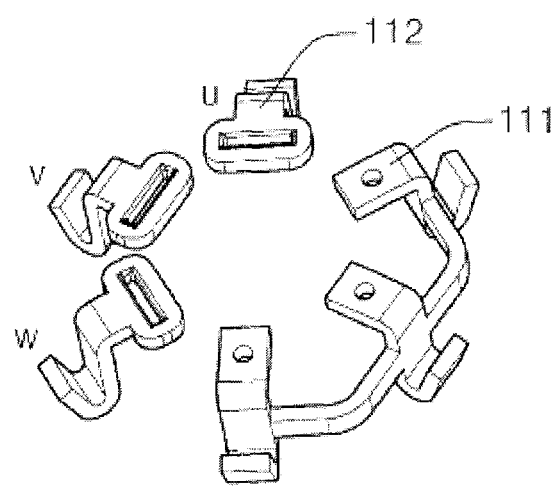
FIG. 7 is a perspective view illustrating ground electrode and coil electrode of connector unit of connecting molding for automatic winding of three phase motor according to the present invention.
Figure 8:
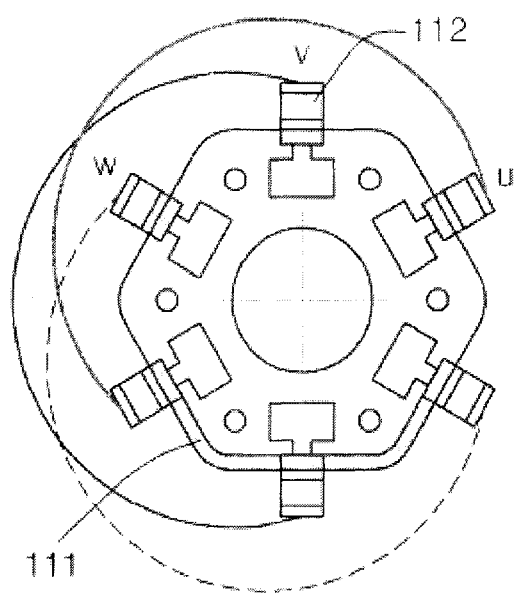
FIG. 8 is a view illustrating winding of connector unit of connecting molding for automatic winding of three phase motor according to the present invention.

The connector unit 110 as illustrated in FIG. 6 through FIG. 8 is connected to the respective coils of three phases. A single ground electrode is provided inside the connector unit 110 so that a ground coil for grounding the coils of three phases is connected in one line. Three coil electrodes 112 are formed to respectively connect the coils of three phases from the coil unit 120. Each of the three coil electrodes 112 has a first terminal for connecting to corresponding one of the coils of three phases and a second terminal having a hole 113, where the hole 113 of the second terminal is inserted by one of external power supply connecting terminals 141 formed in the main unit 140, via an insert hole 114 of the connector unit 110. The ground electrode 111 and the respective coil electrodes are automatically connected with coils.

A coupling unit 121 is formed at an upper portion of the coil unit 120. The coupling unit 121 is inserted and coupled into the connector unit 110. A protrusion 122 is formed on an outer circumferential surface of the coupling unit 121. The coupling unit 121 is inserted into a hole formed at a center portion of the connector unit 110. A groove is formed on an inner circumference surface of the hole. The coupler unit 121 is fixed to the connector unit 110 by inserting the protrusion 122 into the groove.

Details of the present invention are described below.

As illustrated in FIG. 3 through FIG. 5, the present invention is configured by coupling the fixing the coil unit 130 inside the main unit 140, coupling the coil unit 120 wound by the ground and the three phase coils inside the fixed coil unit 130, fixing the center shaft 150 passing through the center of the coil unit 120 to the top and bottom portions of the main unit 140 while leaving a certain gap spaced apart from the coil unit 120, and coupling the connector unit 110 which center is passed through by the center shaft 150 to the upper portion of the coil unit 120.

As illustrated in FIG. 6 through FIG. 8, the ground coil of the coil unit 120 is connected to the connector unit 110 and the three terminals connected with each other form the ground terminal 111. The W, V, U phase coil electrodes 112 respectively connected to the three phase coils are disposed in circular shape to be coupled and fixed by molding.

The coils of each phase and the ground coil are connected to the respective coil electrodes 112 and the ground electrode 111 of the connector unit 110 by a method of welding, winding or connecting and so forth using an automatic apparatus.

The ground electrode 111 of the connector unit 110 is formed with the three terminals to be connected to the three phase coil electrodes 112 respectively disposed horizontal with the three terminals of the ground electrode 111 by any one method among welding, winding or connecting with cable through an automatic apparatus.

As illustrated in FIG. 6, insert holes 114 through which the external power supply connecting terminals 141 are inserted, are formed in the connector unit 110, the external power supply connecting terminals 141 formed in the main unit 140 are connected to the external power supply.

Further, as illustrated in FIG. 5, the coupling unit 121 inserted to be coupled to the connector unit 110 is formed at the upper portion of the coil unit 120 and the protrusion 122 is formed on the outer circumferential surface of the coupling unit. The coupling unit 121 is inserted into the hole formed at the center portion of the connector unit 110. The protrusion 122 is inserted and fixed to the groove formed on the inner circumferential surface of the hole.

The invention claimed is:

1. A connecting molding for automatic winding of three phase motor, comprising:

a main unit formed of hard material in circular or polygonal column shape and including external power supply connecting terminals, the external power supply connecting terminals connecting to an external power supply;

a coil unit inserted into the main unit with a certain gap spaced apart from an inside of the main unit;

coils wound on the coil unit and having three phases;

a center shaft inserted into a center of the coil unit and passing through the main unit to be coupled with the main unit;

a permanent magnet coupled to an outside of the center shaft and spaced apart a certain gap from an inside of the coil unit to be rotated in the coil unit;

a fixed coil unit installed between the coil unit and the main unit to be fixed to the main unit;

a ground electrode having three terminals in a single body, each of the terminals connecting to a first end of corresponding one of the coils;

three coil electrodes separated from one another, each of the coil electrodes having a first terminal connecting to a second end of corresponding one of the coils and a second terminal having a hole receiving one of the external power supply connecting terminals; and a connector unit coupled to an upper side of the coil unit and fixing the ground electrode and the coil electrodes on a same surface thereof, the connector unit having insert holes through which the external power supply connecting terminals are inserted.

2. The connecting molding for automatic winding of three phase motor according to claim 1, further comprising:

a coupling unit formed in an end of the coil unit and inserted and coupled into a center hole of the connector unit; and a protrusion formed on an outer circumferential surface of the coupling unit and inserted into a groove formed in the center hole of the connector unit.

* * * * *